2,996,630
TIMING DEVICE

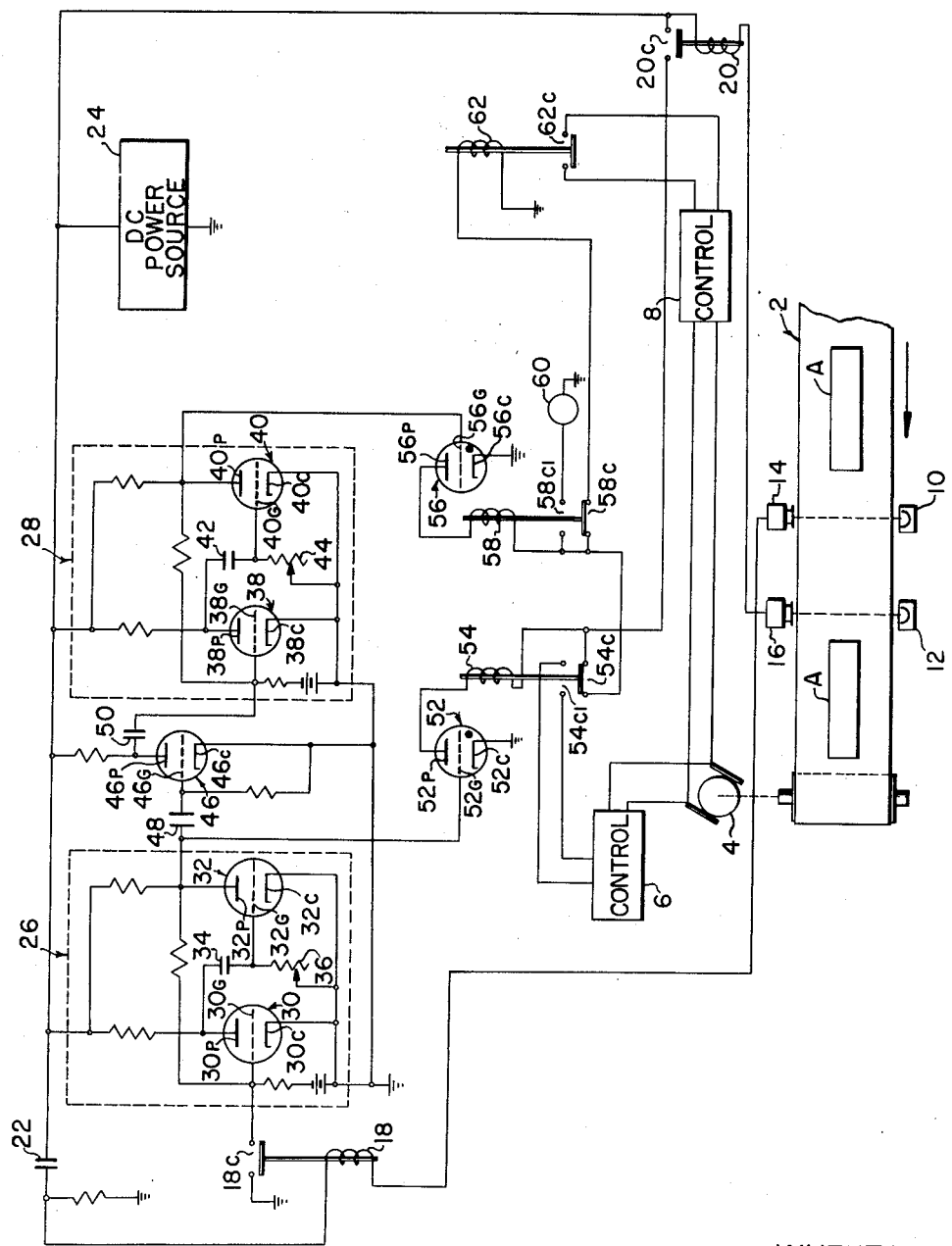

Eugene E. Bensema, Chicago, and Alfred Freeman, Crete, Ill., assignors to United States Steel Corporation, a corporation of New Jersey
Filed Jan. 22, 1959, Ser. No. 788,373
4 Claims. (Cl. 307—141.8)

This invention relates to a timing device and more particularly to such a device for determining the time interval between two sequential electrical impulses. There are many situations where it is desired to know whether such two sequential impulses fall below, above or within a selected time limit. These impulses may be related to physical concepts such as speed, rate of change of pressure, temperature, or light intensity.

It is therefore an object of our invention to provide a simple timing device which will indicate whether two sequential electrical impulses fall below, above or within a selected time interval.

This and other objects will be more apparent after referring to the following specification and attached drawing, in which:

The single figure is a schematic electrical diagram of the invention as applied to a conveyor.

Referring more particularly to the drawing, reference numeral 2 indicates a conveyor which is driven by a motor 4 and over which objects A pass in sequence. Controls 6 and 8 may be provided for decreasing and increasing the speed of the motor. Light sources 10 and 12 are provided to one side of the conveyor 2 and are spaced longitudinally thereof. Photocells 14 and 16 are provided in alignment with lights 10 and 12, respectively, on the opposite side of conveyor 2. The photoelectric device 14 is arranged to operate a relay coil 18 when an object A cuts off light thereto. The photoelectric device 16 is arranged to operate a relay coil 20 when the same object A cuts off light thereto. Relay coil 18 has a normally open contact 18C and relay coil 20 a normally open contact 20C. The relay coil 18 is connected in series with a capacitance 22 which in turn is connected to a D.C. power source 24. Two monostable multivibrators 26 and 28 are connected in series to D.C. power source 24. The multivibrator 26 includes two triodes 30 and 32 connected as shown, contact 18C being connected in series with grid 30G. Plate 30P is connected to grid 32G through a capacitor 34. Grid 32G is also connected to ground through a variable resistor 36. The capacitor 34 and resistor 36 determine the time interval of multivibrator 26. Cathodes 30C and 32C are connected to ground. Multivibrator 28 includes two triodes 38 and 40 with their cathodes 38C and 40C being connected to ground. Plate 38P is connected to grid 40G through a capacitor 42. Grid 40G is also connected to ground through a variable resistor 44. Capacitor 42 and resistor 44 determine the time interval of multivibrator 28. The output of multivibrator 26 is transmitted to grid 38G through a triode 46. Plate 32P is connected to grid 46G through a capacitor 48. Plate 46P is connected to grid 38G through a capacitor 50. The output of multivibrator 26 is also connected to grid 52G of a Thyratron tube 52. Plate 52P is connected in series with relay coil 54 and contact 20C. Relay coil 54 has normally closed contact 54C and normally open contact 54C1. Normally open contact 54C1 is connected in series with control 6. The output of multivibrator 28 is connected to grid 56G of a Thyratron tube 56. Plate 56P is connected in series with a relay coil 58, contact 54C and contact 20C. Relay coil 58 has a normally closed contact 58C and a normally open contact 58C1. Contact 58C1 is connected in series with contact 20C, contact 54C and signal light 60. A relay coil 62 which has a normally open contact 62C is connected in series with contacts 58C, 54C and 20C. Contact 62C is connected to operate control 8. Resistors and batteries are connected in the circuit as shown in the usual manner.

The operation of our device is as follows:

The distance between photoelectric devices 14 and 16 and the timing cycle of multivibrators 26 and 28 are so arranged that an object passing down the conveyor 2 will interrupt the light beam from light sources 10 and 12 sequentially at an interval which is commensurable with the desired speed of the conveyor. When the light from source 10 to the photoelectric device 14 is cut off by object A passing down conveyor 2, relay coil 18 will be energized momentarily because of the series capacitance 22, thus closing contact 18C and applying ground potential to the grid 30G, thus causing triode 30 to conduct and triode 32 to be cut off. This is the unstable state of the multivibrator 26. When the capacitor 34 becomes charged after a given time interval controlled by the capacitor 34 and resistor 36, the grid 32G reaches a potential which allows triode 32 to conduct. This cuts off triode 30 and returns multivibrator 26 to its stable state. When this occurs a negative voltage will be generated at plate 32P which, when applied through condenser 48 and grid 46G will produce a positive pulse on plate 46P. This positive pulse is applied to grid 38G causing triode 38 to conduct and multivibrator 28 to go through its timing period in the same manner as multivibrator 26. During the unstable state of the multivibrators 26 and 28 the associated Thyratrons 52 and 56, respectively, are held in a conductive state and if plate voltage is supplied thereto at that time conduction will take place. Thus if the object A cuts off light to photoelectric device 16 while multivibrator 26 is in its unstable state relay coil 54 will be energized through contact 20C. This is an indication that the conveyor is traveling too fast and contact 54C1 closes to operate the control 6 and slow down the motor 4. If the object A cuts off light to photoelectric device 16 after multivibrator 26 is back to its stable state but while multivibrator 28 is in its unstable state relay coil 58 will be energized through contacts 54C and 20C. This will close contact 58C1, energizing light 60 to indicate that the conveyor 2 is moving at the correct speed. If the object A cuts off light to the photoelectric device 16 after both multivibrators 26 and 28 have returned to their stable states, relay coil 62 will be energized through contacts 20C, 54C and 58C. This will be an indication that the conveyor is traveling too slow and contact 62C closes, thus completing the circuit to control 8 to speed up the motor 4. Our device has been shown in conjunction with a conveyor for illustration purposes only and the device may be applied to any other equipment where two sequential impulses are obtained. If it is desired to obtain an indication only of over and under the time interval the second multivibrator 28 may be omitted and the relay coil 62 connected to contact 20C directly through contact 54C. It will also be noted that more than two multivibrators may be used to control or detect more than the indicated condition. For example, four multivibrators may be used to give large error and small error signals for the conditions over and under the selected range.

While one embodiment of our invention has been shown and described it will be apparent that other adaptations and modifications may be made without departing from the scope of the following claims.

We claim:

1. Apparatus for determining the time interval between two sequential impulses comprising a first monostable multivibrator having a known timing period, a second monostable multivibrator having a known timing period connected in series with said first monostable multivibrator, means for transmitting the first of said sequential impulses to said first monostable multivibrator, means for transmitting a pulse from said first monostable multivibrator to said second monostable multivibrator after the timing period of said first monostable multivibrator, means operable by the second of said sequential impulses to obtain a signal if the said first monostable multivibrator is in unstable state, and means operable by the second of said sequential impulses to obtain a signal if the said second monostable multivibrator is in unstable state.

2. Apparatus for determining the time interval between two sequential impulses comprising a first monostable multivibrator having a known timing period, a second monostable multivibrator having a known timing period connected in series with said first monostable multivibrator, means for transmitting the first of said sequential impulses to said first monostable multivibrator, means for transmitting a pulse from said first monostable multivibrator to said second monostable multivibrator after the timing period of said first monostable multivibrator, means operable by the second of said sequential impulses to obtain a signal if the said first monostable multivibrator is in unstable state, means operable by the second of said sequential impulses to obtain a signal if the said second monostable multivibrator is in unstable state, and means operable by the second of said sequential impulses to obtain a signal if both of said monostable multivibrators are in stable state.

3. Apparatus for determining the time interval between two sequential impulses comprising a first monostable multivibrator having a known timing period, a second monostable multivibrator having a known timing period connected in series with said first monostable multivibrator, a triode for transmitting a pulse from said first monostable multivibrator to said second monostable multivibrator after the timing period of said first monostable multivibrator, a Thyratron tube having its grid connected to the output of said first monostable multivibrator, means for transmitting the first of said sequential impulses to said first monstable multivibrator, a first circuit including said first Thyratron tube, a signal device and a contact connected in series, a second Thyratron tube having its grid connected to the output of said second monostable multivibrator, a second circuit including said second Thyratron tube, a second signal device and said contact connected in series, and means operable by the second of said sequential impulses to close said contact.

4. Apparatus for determining the time interval between two sequential impulses comprising a first monostable multivibrator having a known timing period, a second monostable multivibrator having a known timing period connected in series with said first monostable multivibrator, a triode for transmitting a pulse from said first monostable multivibrator to said second monostable multivibrator after the timing period of said first monostable multivibrator, a first Thyratron tube having its grid connected to the output of said first monostable multivibrator, means for transmitting the first of said sequential impulses to said first monostable multivibrator, a first circuit including said first Thyratron tube, a signal device and a contact connected in series, a second Thyratron tube having its grid connected to the output of said second monostable multivibrator, a second circuit including said second Thyratron tube, a second signal device and said contact connected in series, means operable by the second of said sequential impulses to close said contact, a third signal device, and means operable by the closing of said contact to operate said third signal device when both of said monostable multivibrators are in stable state.

References Cited in the file of this patent
UNITED STATES PATENTS

| | | |
|---|---|---|
| 2,406,978 | Wendt et al. | Sept. 3, 1946 |
| 2,560,124 | Mofenson | July 10, 1951 |
| 2,560,289 | Hasbrook | July 10, 1951 |
| 2,580,073 | Burton | Dec. 25, 1951 |
| 2,614,218 | Hancock | Oct. 14, 1952 |
| 2,644,156 | Schneider | June 30, 1953 |
| 2,679,598 | Wright et al. | May 25, 1954 |
| 2,784,910 | Ghiorso et al. | Mar. 12, 1957 |
| 2,797,367 | Scott et al. | June 25, 1957 |